(12) United States Patent
Ginis et al.

(10) Patent No.: US 7,962,646 B2
(45) Date of Patent: Jun. 14, 2011

(54) CONTINUOUS FEEDBACK-CONTROLLED DEPLOYMENT OF MESSAGE TRANSFORMS IN A DISTRIBUTED MESSAGING SYSTEM

(75) Inventors: Roman Ginis, Elmsford, NY (US); Robert Evan Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 12/115,798

(22) Filed: May 6, 2008

(65) Prior Publication Data

US 2008/0244025 A1 Oct. 2, 2008

Related U.S. Application Data

(63) Continuation of application No. 10/841,297, filed on May 7, 2004, now abandoned.

(51) Int. Cl.
G06F 13/00 (2006.01)
(52) U.S. Cl. .......................... 709/238; 709/225; 709/226
(58) Field of Classification Search ................... 709/223, 709/224, 225, 226, 230, 238
See application file for complete search history.

(56) References Cited

U.S. PATENT DOCUMENTS

| | | | |
|---|---|---|---|
| 5,091,918 A | 2/1992 | Wales | |
| 5,940,372 A | 8/1999 | Bertin et al. | |
| 5,987,455 A | 11/1999 | Cochrane et al. | |
| 6,118,786 A | 9/2000 | Tiernan et al. | |
| 6,298,455 B1 * | 10/2001 | Knapman et al. | 714/43 |
| 6,421,359 B1 | 7/2002 | Bennett et al. | |
| 6,502,213 B1 | 12/2002 | Bowman-Amuah | |
| 6,510,429 B1 | 1/2003 | Todd | |
| 6,748,555 B1 | 6/2004 | Teegan et al. | |
| 6,748,583 B2 | 6/2004 | Aizenbud-Reshef et al. | |
| 6,859,438 B2 | 2/2005 | Haddock et al. | |
| 6,983,463 B1 | 1/2006 | Hunt | |
| 7,010,538 B1 | 3/2006 | Black | |
| 7,162,524 B2 | 1/2007 | Astley et al. | |
| 7,392,279 B1 | 6/2008 | Chandran et al. | |
| 2002/0069244 A1 | 6/2002 | Blair et al. | |
| 2003/0067874 A1 | 4/2003 | See et al. | |
| 2004/0039786 A1 | 2/2004 | Horvitz et al. | |
| 2004/0196837 A1 | 10/2004 | Cinkler | |
| 2005/0010765 A1 | 1/2005 | Swander et al. | |
| 2005/0251556 A1 | 11/2005 | Ginis et al. | |
| 2005/0268146 A1 | 12/2005 | Jin et al. | |

(Continued)

OTHER PUBLICATIONS

USPTO Office Action for U.S. Appl. No. 12/115,742 dated Dec. 10, 2009.

(Continued)

*Primary Examiner* — Viet Vu
(74) *Attorney, Agent, or Firm* — Yee & Associates, P.C.; Louis J. Percello

(57) ABSTRACT

The present invention solves the disadvantages of the prior art and provides a distributed messaging system supporting stateful subscriptions. A stateful publish-subscribe system extends the functionality of the content-based approach to include more general state-valued expressions. A plurality of broker machines is provided to deliver messages sent by publishing clients toward subscribing clients based upon the contents of the messages and stateful transformations requested by the subscribing clients. Subscription specifications are analyzed by a compiler and converted into a collection of message transforms and views. A deployment service component deploys tasks to optimize system performance. A monitoring services component detects a possible need to reconfigure. A performance optimization service component computes new assignment of transforms. A continuous deployment service implements a redeployment protocol that installs changes to transform placement while the existing publish-subscribe system continues to operate.

22 Claims, 7 Drawing Sheets

U.S. PATENT DOCUMENTS

| | | |
|---|---|---|
| 2006/0067231 A1 | 3/2006 | Ikoma et al. |
| 2006/0195896 A1 | 8/2006 | Fulp et al. |
| 2006/0200333 A1 | 9/2006 | Dalal et al. |
| 2006/0294219 A1 | 12/2006 | Ogawa et al. |
| 2007/0002750 A1 | 1/2007 | Sang et al. |
| 2007/0116822 A1 | 5/2007 | Prakash et al. |
| 2007/0297327 A1 | 12/2007 | Strom |
| 2008/0239951 A1 | 10/2008 | Strom |
| 2008/0301053 A1 | 12/2008 | Tserkovny et al. |
| 2009/0187641 A1 | 7/2009 | Li et al. |

OTHER PUBLICATIONS

USPTO Notice of allowance for U.S. Appl. No. 12/115,742 dated May 17, 2010.

Babcock et al., "Distributed Top-K Monitoring", SIGMOD 2003, Jun. 2003, San Diego, CA, ACM 1-58113-634X/0306, pp. 1-12.

Bertsekas, "Dynamic Programming and Optimal Control", vol. II, Athena Scientific, 1995, pp. 184, 186, 203, 204, and 207.

Hwang et al., "A Comparison of Stream-Oriented High-Availability Algorithms", Brown University, http://www.cs.brown.edu/publications/techreports/reports/CS-03-17.html, Sep. 2003, pp. 1-13.

Madden et al., "Fjording the Stream: An Architecutre for Queries over Streaming Sensor Data", Proceedings of the 18th International Conference on Data Engineering, Jun. 26, 2001, pp. 1-25.

Gehrke et al., "On Computing Correlated Aggregates Over Continual Data Streams", Proceedings of the 2001 ACM SIGMOD International Conference on Management of Data, May 21-24, 2001, 12 pages.

Babu et al., "Continuous Queries over Data Streams", Stanford University, vol. 30, Issue 3, Sep. 2001, 12 pages.

Datar et al., "Maintaining Stream Statistics over Sliding Windows ", Stanford University, Proceedings of the thirteenth annual ACM-SIAM Symposium on Discrete Algorithms, ISBN: 0-89871-513-X, Jul. 30, 2001, pp. 1-10 and Appendix i-ii.

Babcock et al., "Models and issues in Data Stream Systems", Proceedings of the twenty-first ACM SIGMOD-SIGACT-SIGART Symposium on Principles of database systems, Mar. 9, 2002, pp. 1-30.

Carney et al., "Monitoring Streams—A New Class of DBMS Applications", Technical Report CS-02-1, Department of Computer Science, Brown University, Feb. 2002, pp. 1-25.

Chandrasekaran et al., "Streaming Queries over Streaming Data", Proceedings of the 28th VLDB Conference, Hong Kong, China, 2002, 12 pages.

Carney et al., "Monitoring Streams—A New Class of Data Management Applications", Proceedings of the 28th VLDB Conference, Hong Kong, China, 2002, 12 pages.

Kang et al., "Evaluating Window Joins Over Unbounded Streams", Proceedings of the 28th VLDB Conference, Hong Kong, China, 2002, 12 pages.

Madden et al., "Continuously Adaptive Continuous Queries over Streams", Proceedings of the 2002 ACM SIGMOD International Conference on Management of Data, ISBM: 1-58113-497-5, Jun. 4-6, 2002, 12 pages.

Cherniack et al., "Scalable Distributed Stream Processing", Proceedings of the 1st Biennial Conference on Innovative Data Systems Research (CIDR), 2003, 12 pages.

Motwani et al., "Query Processing, Approximation, and Resource Management in a Data Stream Management System", Stanford University, Proceedings of the 1st Biennial Conference on Innovative Data Systems Research (CIDR), 2003, pp. 1-12.

Shah et al., "Flux: An Adaptive Partitioning Operator for Continuous Query Systems", Technical Report CSD-2-1205, http://techreports.1ib.bekeley.edu/accessPages/CSD-02-1205.html, University of California, Berkeley, California, Nov. 15, 2002, pp. 1-15.

Abadi et al., "Aurora: A New Model and Architecture for Data Stream Management", The VLDB Journal—The International Journal on Very Large Daata bases, vol. 12, Issue 2, Aug. 2003, pp. 1-20.

Jin et al., "Relational Subscription Middleware for Internet-Scale Publish Subscribe", DEBS 2003, ACM: 1-58113-843-1, Jun. 8, 2003, pp. 1-8.

Bhola et al., "Exactly-Once Delivery in a Content-based Publish Subscribe System", 2002, Proceedings of the International Conference on Dependable Systems and Networks (DSN'02).

* cited by examiner

CONTINUOUS FEEDBACK-CONTROLLED DEPLOYMENT OF MESSAGE TRANSFORMS IN A DISTRIBUTED MESSAGING SYSTEM

This application is a continuation of application Ser. No. 10/841,297, filed May 7, 2004, now abandoned.

CROSS REFERENCE TO RELATED APPLICATIONS

The present application is related to U.S. patent application Ser. No. 10/841,297, entitled "DISTRIBUTED MESSAGING SYSTEM SUPPORTING STATEFUL SUBSCRIPTIONS," filed on May 7, 2004, status abandoned, assigned to the same assignee, and incorporated herein by reference.

BACKGROUND OF THE INVENTION

1. Technical Field

The present invention relates to data processing systems and, in particular, to messaging systems in a distributed processing environment. Still more particularly, the present invention provides a distributed messaging system supporting stateful subscriptions.

2. Description of Related Art

A publish-subscribe messaging middleware is a system in which there are two types of clients. Publishers generate messages, also referred to as events, containing a topic and some data content. Subscribers request a criterion, also called a subscription, specifying what kind of information, based on published messages, the system is to deliver in the future. Publishers and subscribers are anonymous, meaning that publishers do not necessarily know how many subscribers there are or where they are and, similarly, subscribers do not necessarily know where publishers are.

A topic-based, or content-based, publish-subscribe system is one in which the delivered messages are a possibly filtered subset of the published messages and the subscription criterion is a property that can be tested on each message independent of any other message. For example, a filter may determine whether "topic=stock-ticker" or "volume>1000." Content-based or topic-based publish-subscribe systems are referred to herein as "stateless."

There are pre-existing and emerging alternative technologies to solve the deficiencies of content-based publish-subscribe systems. Message mediators may be introduced into the flow of traditional messaging middleware. This is a useful concept; however, in their current manifestations, mediators are complex to program, require external database services in order to store and access state, and groups of mediators cannot be automatically combined.

Traditional database systems may also be used. Each published message can be fed to a database and give rise to a cascade of transactions updating the message history. Subscriptions can be expressed as views of these histories. Technologies are being developed to allow views to be updated incrementally. Such an approach is easier to program; however, it can be costly and slow if each new message results in a transaction involving a large number of subscribers.

An emerging technology still being researched is continuous queries on data streams. These approaches preserve the simpler programming model of the database system approach above and attempt to reduce the cost of traditional databases by a combination of approaches, including batching message updates and restricting the available operations to ones allowing the use of bounded-sized, in-memory sliding windows. However, this approach is restricting and limited.

SUMMARY OF THE INVENTION

The present invention solves the disadvantages of the prior art and provides a distributed messaging system supporting stateful subscriptions. A stateful publish-subscribe system extends the functionality of the content-based approach to include more general state-valued expressions. Stateful subscriptions may refer to one or more message histories and may include more complex expressions. Therefore, subscribers may receive different information than that provided in the published messages. A plurality of broker machines is provided to deliver messages sent by publishing clients toward subscribing clients based upon the contents of the messages and stateful transformations requested by the subscribing clients. These broker machines form an overlay network. Subscription specifications are either given as a directed transformation graph (with nodes being the transforms required to derive the subscription from published messages and edges representing the ordering of the transforms) or in a language that can be analyzed by a compiler and converted into a collection of message transforms and views. The messaging system builds a structure containing all message transforms and views needed for all intermediate and subscribed views of all subscriptions.

The messaging system uses this structure to allocate message transforms and views to broker machines in the overlay network. A deployment service component deploys tasks to optimize system performance. A monitoring services component detects a possible need to reconfigure. A performance optimization service component computes new assignment of transforms. A continuous deployment service implements a redeployment protocol that installs changes to transform placement while the existing publish-subscribe system continues to operate.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
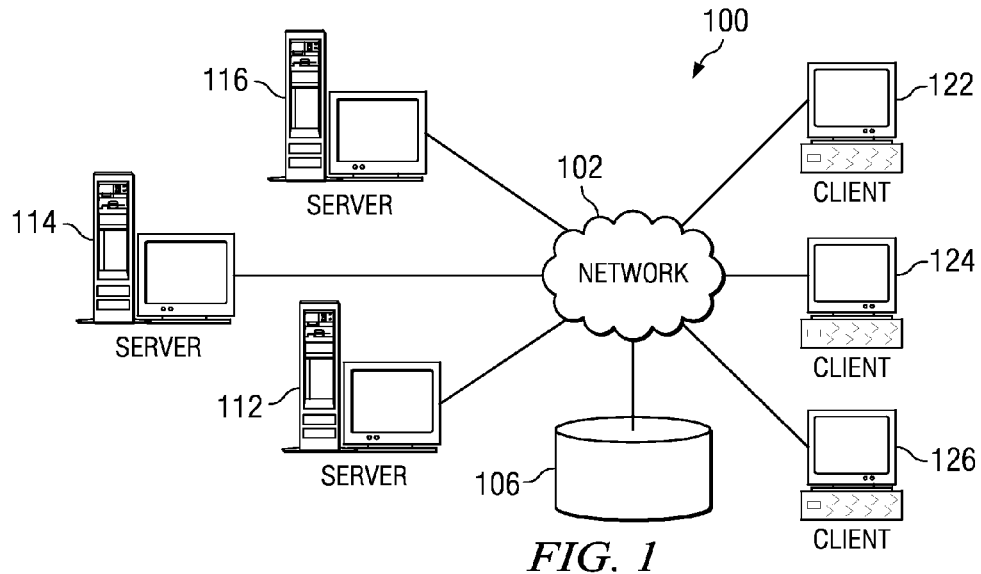
FIG. 1 depicts a pictorial representation of a network of data processing systems in which the present invention may be implemented.
Figure 2:
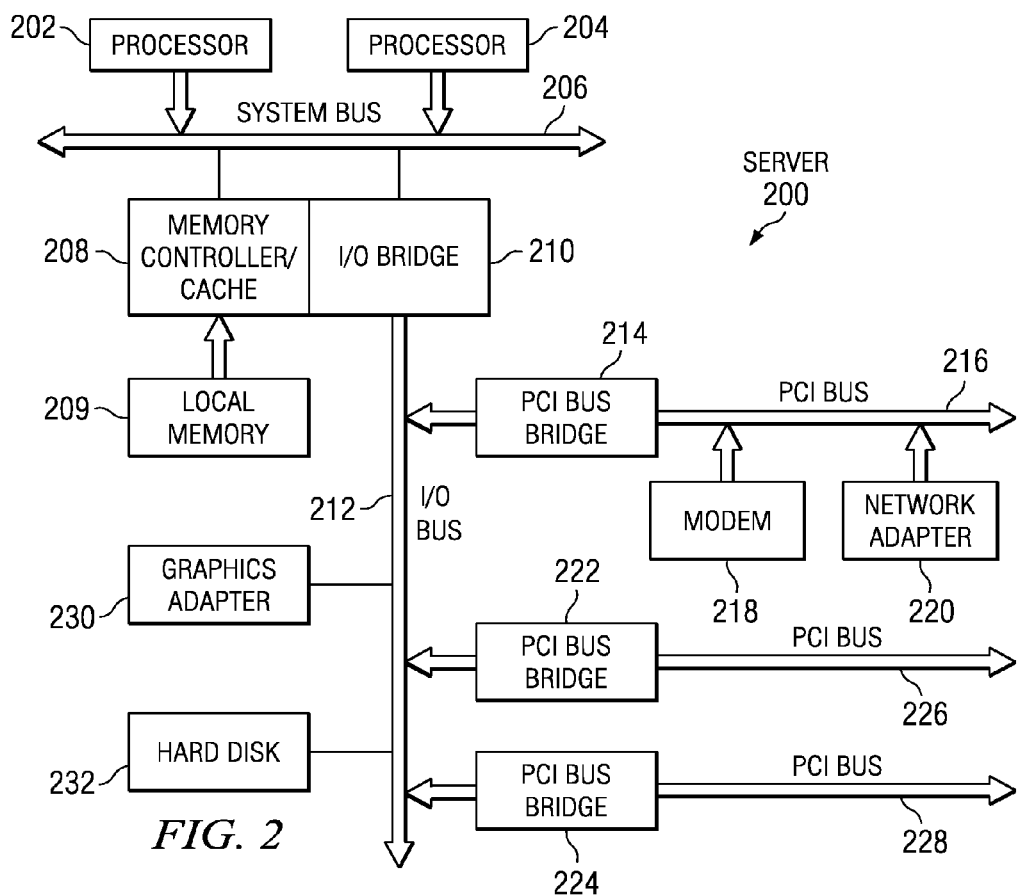
FIG. 2 is a block diagram of a data processing system that may be implemented as a server in accordance with a preferred embodiment of the present invention.
Figure 3:
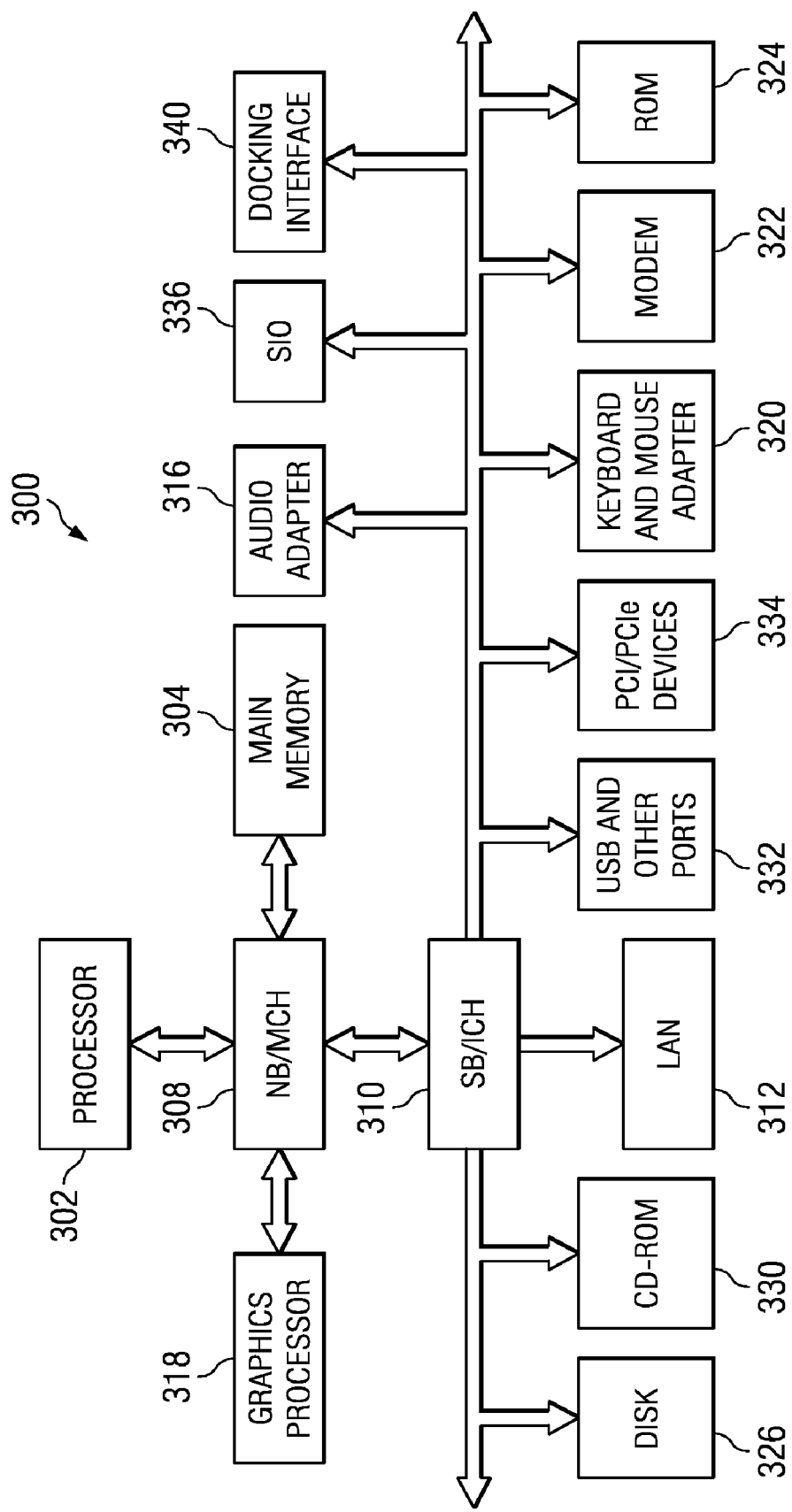
FIG. 3 is a block diagram of a data processing that may serve as a client of a service in accordance with a preferred embodiment of the present invention.

The present invention provides a method, apparatus and computer program product for continuous feedback-controlled deployment of message transforms in a distributed messaging system. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 112, 114, 116 are connected to network 102 along with storage unit 106. In addition, clients 122, 124, and 126 are connected to network 102. These clients 122, 124, and 126 may be, for example, personal computers or network computers. In the depicted example, servers 112, 114, 116 provide data, such as boot files, operating system images, and applications to clients 122, 124, 126. Clients 122, 124, and 126 are clients to servers 112, 114, 116. Network data processing system 100 may include additional servers, clients, and other devices not shown.

In accordance with a preferred embodiment of the present invention, network data processing system 100 provides a distributed messaging system that supports stateful subscriptions. A subset of clients 122, 124, 126 may be publishing clients, while others of clients 122, 124, 126 may be subscribing clients, for example. Published events may also be generated by one or more of servers 112, 114, 116. Any computer may be both a publisher and a subscriber.

A stateful publish-subscribe system is a distributed messaging system in which at least one subscription is stateful. Other subscriptions may be content-based or, in other words, stateless. In other words, a stateful publish-subscribe system must compute information that requires multiple messages of one or more streams. For example, a stateful subscription may request, "Give me the highest quote within each one-minute period." A stateful subscription may entail delivering information other than simply a copy of the published messages. For example, a stateful subscription may request, "Tell me how many stocks fell during each one-minute period."

The stateful publish-subscribe system is implemented within an overlay network, which is a collection of service machines, referred to as brokers, that accept messages from publisher clients, deliver subscribed information to subscriber clients, and route information between publishers and subscribers. One or more of servers 112, 114, 116, for example, may be broker machines.

Both content-based and stateful publish-subscribe systems support a message delivery model based on two roles: (1) publishers produce information in the form of streams of structured messages; and, (2) subscribers specify in advance what kinds of information in which they are interested. As messages are later published, relevant information is delivered in a timely fashion to subscribers.

Content-based subscriptions are restricted to Boolean filter predicates that can only refer to fields in individual messages. For example, a content-based subscription may request, "Deliver message if traded volume>1000 shares." On the other hand, stateful subscriptions are more general state-valued expressions and may refer to one or more messages, either by referring to multiple messages of a single message stream or by referring to multiple message streams or both. In a content-based publish-subscribe system, because subscriptions can only specify filtering, all published messages are either passed through to subscribers or filtered out. Therefore, messages received by subscribers are identically structured copies of messages published by publishers. In contrast, in a stateful publish-subscribe system, subscriptions may include more complex expressions and, therefore, subscribers may receive information that is not identical to the published messages with different formatting. For example, a published message may have only integer prices, while subscriptions to average prices may have non-integer averages.

Published message streams are associated with topics. Each topic is associated with a base relation. A base relation is a table of tuples, each tuple corresponding to an event in the particular message stream. Subscriptions are expressed as view expressions in a relational algebraic language, although other representations may be used, such as eXtensible Markup Language (XML), for example. The language defines a cascade of views of base relations and derived views computed from either base relations or other views. At compile-time, the set of subscriptions is compiled into a collection of objects that are deployed and integrated into messaging brokers. At run-time, publishers and subscribers connect to these brokers. Published events are delivered to objects associated with base relations. The events are then pushed downstream to other objects that compute how each derived view changes based on the change to the base relation. Those derived views associated with subscriptions then deliver events to the subscriber informing the subscriber of each change in state.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM eServer™ pSeries® system, a product of International Business Machines Corporation in Armonk, N.Y., running the Advanced Interactive Executive (AIX) operating system or LINUX operating system.

With reference now to FIG. 3, a block diagram of a data processing that may serve as a client of a service in accordance with a preferred embodiment of the present invention. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system such as Java may run in conjunction with the operating system and provides calls to the operating system from Java programs or applications executing on data processing system 300. "JAVA" is a trademark of Sun Microsystems, Inc. Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

In accordance with a preferred embodiment of the present invention, a plurality of broker machines are responsible for delivery of message sent by publishing clients towards subscribing clients based upon the content of the messages and the stateful transformations requested by the subscribing clients. These broker machines form an overlay network. Some broker machines may be specialized for hosting publishing clients, referred to as publisher hosting brokers (PHB), and others for hosting subscribing clients, referred to as subscriber hosting brokers (SHB). Between the PHBs and the SHBs, there may be any number of intermediate nodes that include routing and filtering. The brokers at the intermediate nodes are referred to as intermediate brokers or IBs. For expository purposes, this separation is assumed; however, in actual deployment, some or all of the broker machines may combine the functions of PHB, SHB, and/or IB.

Figure 4:
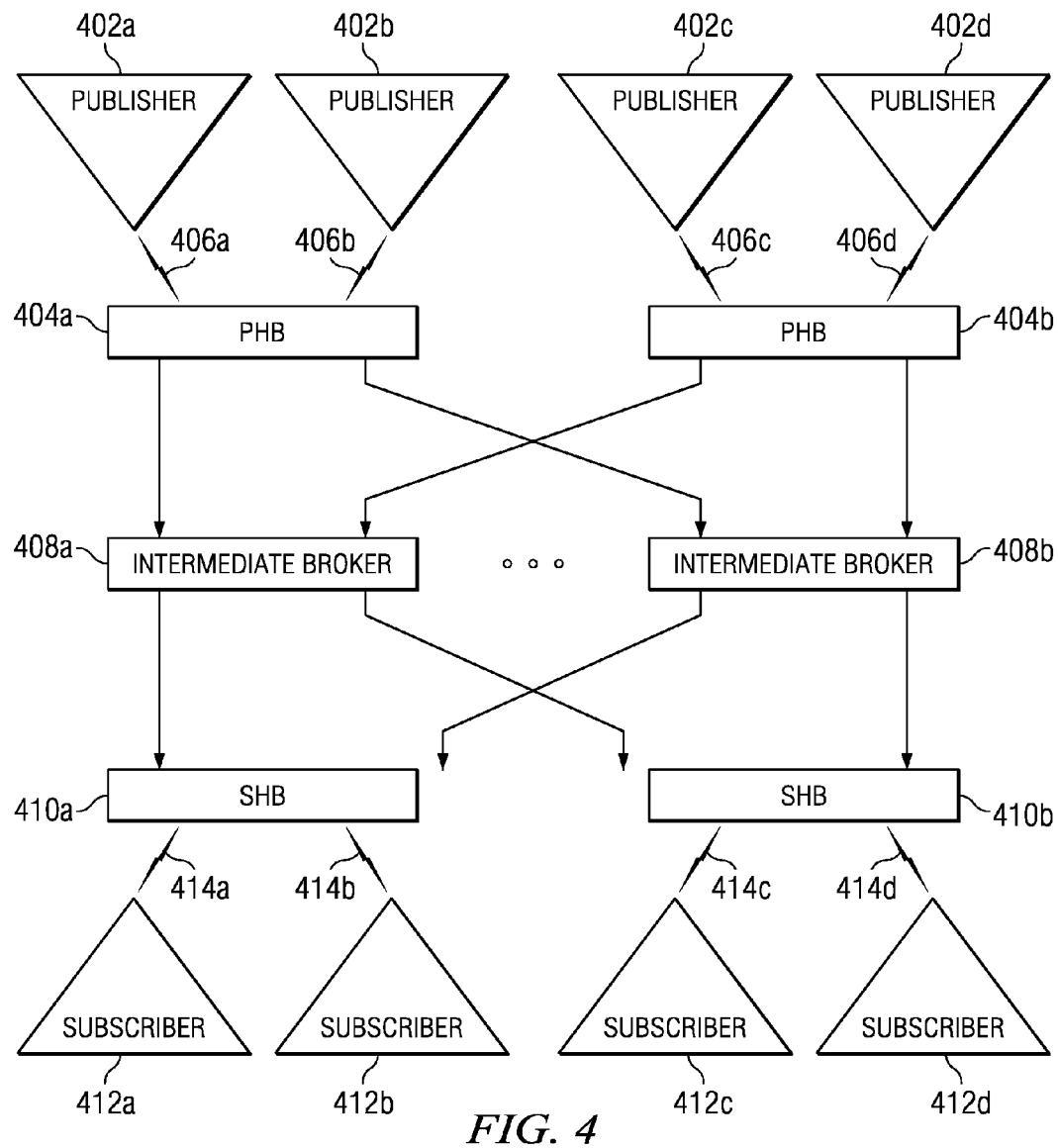
FIG. 4 illustrates a broker network for a publish-subscribe system in accordance with a preferred embodiment of the present invention.

FIG. 4 illustrates a broker network for a publish-subscribe system in accordance with a preferred embodiment of the present invention. A publishing client, such as one of publishers 402a-402d, establishes a connection to a PHB, such as PHB 404a or PHB 404b, over a corresponding one of client connections 406a-406d. The client connection may be, for example, any reliable synchronous or asynchronous first-in/first-out (FIFO) connection, such as a Transmission Control Protocol/Internet Protocol (TCP/IP) socket connection. Independently, a subscribing client, such as one of subscribers 412a-412d, establishes a connection to a SHB, such as SHB 410a or SHB 410b, over a corresponding one of client connections 414a-414d, which may be similar to client connections 406a-406d. The PHBs and SHBs are connected, via intermediate brokers 408a-408b, through broker-to-broker links.

The publish-subscribe system of the present invention may include a fault-tolerant protocol that tolerates link failures and message re-orderings, in which case it is not necessary for the broker-to-broker connections to use reliable FIFO protocols, such as TCP/IP, but may advantageously use faster, less reliable protocols. Each broker machine may be a stand-alone computer, a process within a computer, or, to minimize delay due to failures, a cluster of redundant processes within multiple computers. Similarly, the links may be simple socket connections, or connection bundles that use multiple alternative paths for high availability and load balancing.

Figure 5:
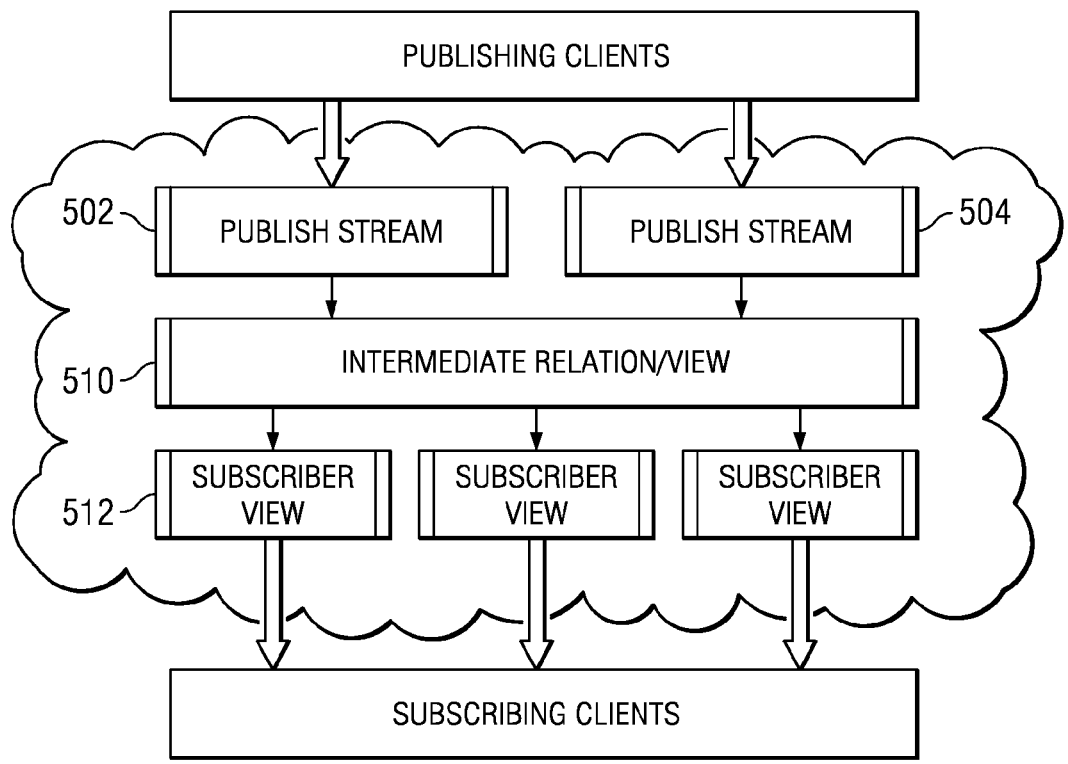
FIG. 5 illustrates how a stateful publish-subscribe service of the present invention appears to clients.

FIG. 5 illustrates how a stateful publish-subscribe service of the present invention appears to clients. Clients are unaware of the physical broker network or its topology. A client application may connect to any broker in the role of publisher and/or subscriber. Publishing clients are aware only of particular named published message streams, such as message streams 502, 504. Multiple clients may publish to the same message stream.

Administrators and clients may defined derived views based on functions of either published message streams or of other derived views. In the depicted example, message streams may be represented as relations. Derived views are represented as relations derived from published message streams or from other derived views by means of relational algebraic expressions in a language, such as Date and Darwen's Tutorial-D, Structured Query Language (SQL), or XQUERY. For example, derived view 510 is defined as a function of stream relations 502 and 504 by means of a JOIN expression with relations 502 and 504 as inputs and relation 510 as an output. Similarly, relation 512, indicated as a subscriber view, is derived from relation 510 by client-specified relational expressions. For example, subscriber view 512 may be a request to group the stock trades of relation 510 by issue and hour and compute the running total volume and max and min price for each issue-hour pair.

Each subscribing client subscribes to one or more particular derived views. As published events enter the system from publishing clients, they are saved in their respective streams. The system is then responsible for updating each derived view according to the previously specified relational expressions and then continuously delivering messages to each subscribing client representing the changes to the state of the respective subscribed view.

As used herein, the term "message transform" denotes a software component, such as a Java™ programming language object instance, which takes as inputs one or more sequences of messages and produces as output one or more sequences of messages. In typical use, a message transform may keep some local state and is repeatedly triggered upon receipt of a new message (or a batch of new messages) on one of its inputs. The message transform then performs some computation the effect of which is to possibly modify its state and to possibly generate one or more new messages on one or more of its output sequences. By way of example, the input messages of a transform may represent published events, such as stock trades, and the output messages of the transform might represent changes to a table of total stock volume per day grouped by stock issue. The function of the transform is to compute the change to the total in the appropriate row based upon the current state whenever a new published event arrives.

A sequence processing graph consists of a multiplicity of such message transforms connected together into a flow graph such that the output sequence produced by one message transform is fed into the instance of another transform. On a distributed network, it is possible for some of the transforms in the sequence processing graph to be deployed on different machines. In the system of the present invention, subscribers are interested in the results of one or more functions computed over one or more published sequences (subscriptions). Thus, the system may compute and propagate many message sequences concurrently.

In a preferred embodiment of the present invention, subscription specifications are analyzed by a compiler and converted into a collection of message transform objects and view objects. Each operator that derives a view from one or more inputs corresponds to a one or more transform objects. Each view corresponds to a view object. View objects hold the state of a view. Transform objects express the logic for incrementally updating an output view constituting the result of an operator in response to individual changes to input views constituting the arguments to that operator. Without a compiler, the transform objects can be specified directly. The invention does not depend on the method of transform specification.

Figure 6:
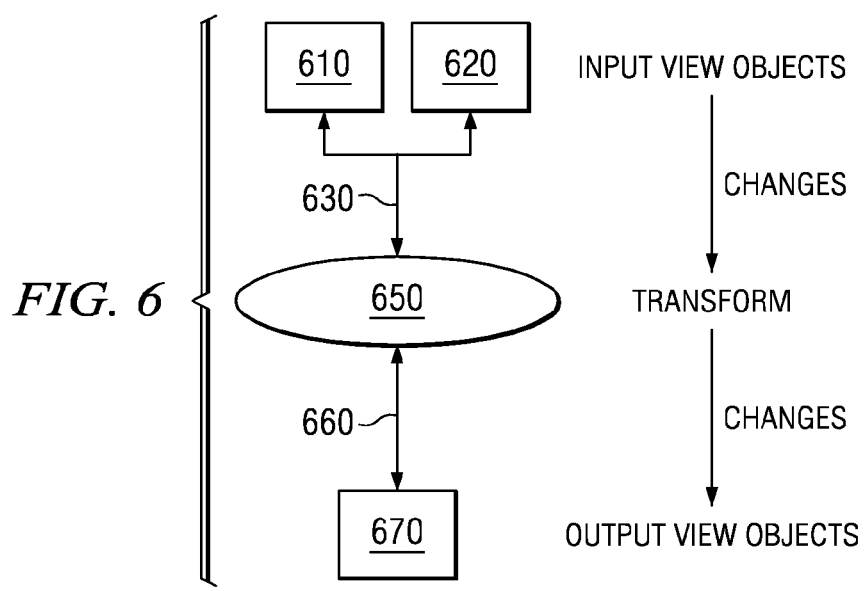
FIG. 6 illustrates an example of a operator that transforms input view objects to an output view object in accordance with a preferred embodiment of the present invention.

FIG. 6 illustrates an example of an operator that transforms input view objects to an output view object in accordance with a preferred embodiment of the present invention. In the depicted example, views 610 and 620 are view objects that are inputs to some operator, such as, for example, a JOIN operator. Transform 650 is a transform object for that operator, which produces a derived view shown as view object 670. When one of the input objects changes, either because it itself is a published input stream or because it is a derived view that has changed as a result of changes to its inputs, messages reflecting the changes are sent to transform object 650. Transform 650 receives the messages representing changes to its inputs 610, 620, computes how the result of the operator changes given the announced changes it has received, and then delivers the computed results to its output view object 670 in the form of change messages. Output view object 670 then propagates in its turn such change messages, either to further transforms, if view object 670 is an intermediate view, or to subscribers, if view object 670 is a subscriber view.

FIG. 6 illustrates the objects and message pathways for a single transform implementing a single computational operation. When subscriptions are entered, the mechanism of the present invention builds a structure containing all of the transform objects and view objects needed for all intermediate and subscribed views of all subscriptions. This structure is called a dataflow hypergraph. The dataflow hypergraph has nodes corresponding to each view object and hyperedges, which may possibly have more than one input feeding an output, representing each transform object associated with an operation in the subscription specification.

The view objects and transform objects are then allocated to actual brokers in the overlay network, either manually by an administrator or automatically via a continuous deployment service as described herein. The published streams and the subscribed views may be constrained to be located on brokers where the publishers and subscribers actually connect. The placement of the intermediate transform objects and view objects is not constrained. That is intermediate transform objects and view objects may be placed wherever suitable, taking into consideration the capacities of the broker machines and the links, as well as the desired performance. After such allocation of objects to brokers, the result is a distributed transform graph.

Figure 7:
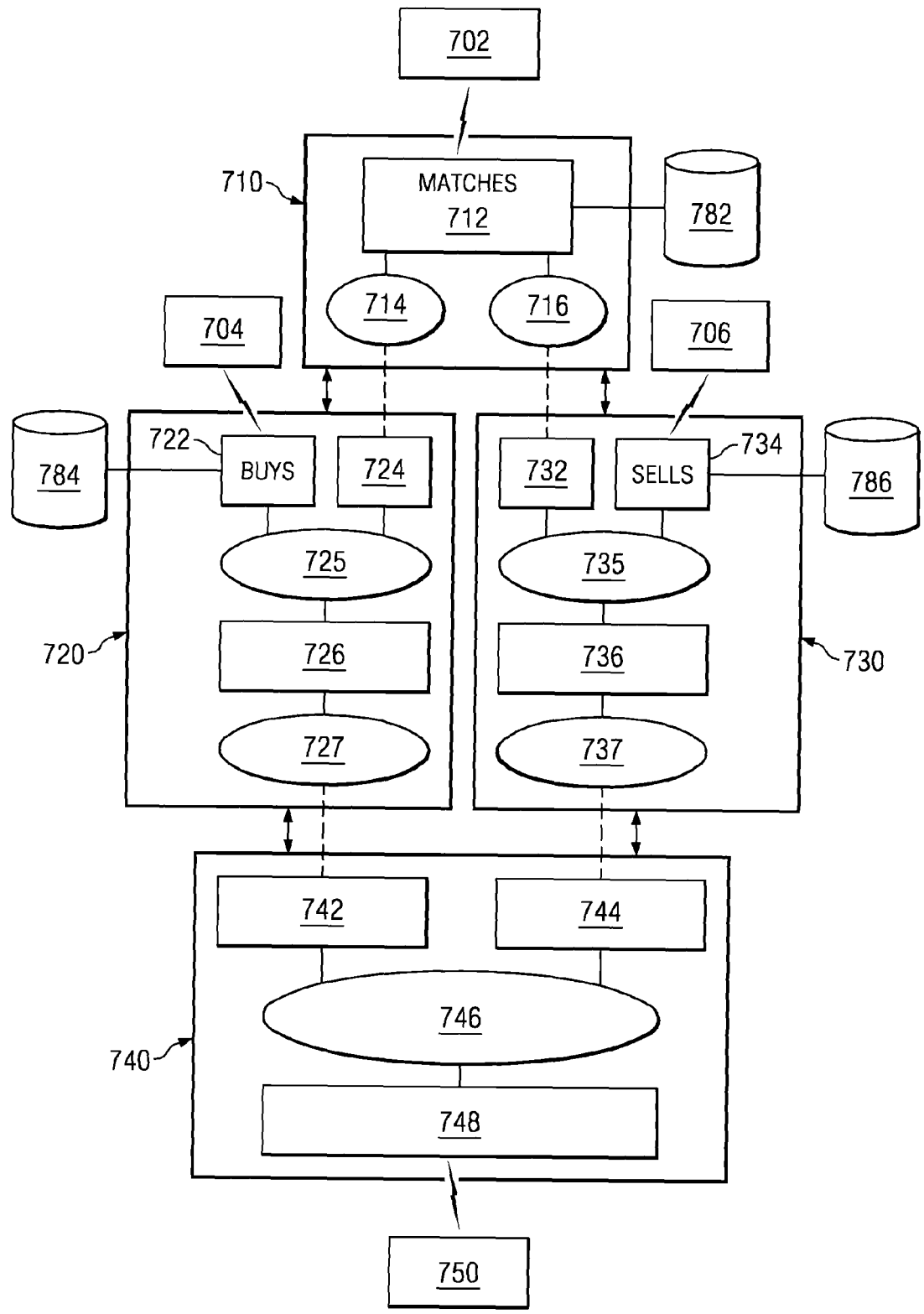
FIG. 7 illustrates an example dataflow hypergraph distributed over multiple brokers in accordance with a preferred embodiment of the present invention.

FIG. 7 illustrates an example dataflow hypergraph distributed over multiple brokers in accordance with a preferred embodiment of the present invention. In the depicted example, the physical network consists of brokers 710, 720, 730, and 740. There are three publishing clients 702, 704, and 706, and one subscribing client 750. The publishing clients are publishing to three separate published message streams: "buys" 722 on broker 720, "sells" 734 on broker 730, and "matches" 712 on broker 710. The subscribing client 750 subscribes to derived view 748 on broker 740.

Broker 710 also includes transforms 714 and 716, which feed change messages to brokers 720 and 730, respectively. Broker 720 includes view objects 724, 726 and transform objects 725, 727. As an example, view object 726 represents an intermediate derived view or relation, which is based on transform 725, published stream 722, and view 724. Broker 730 includes views 732 and 736, in addition to published stream 734, and also includes transforms 735, 737. Broker 740 includes views 742, 744, 748, and transform 746. View 748 is a subscriber view for subscriber 750.

As shown in FIG. 7, the transform graph consists of multiple transform and view objects distributed over all brokers. The paths between objects will sometimes lie within a broker, as is the case between transform object 725 and intermediate view object 726. In other cases, such as the path between transform 727 and intermediate view object 742 (shown with a dotted line), the path must cross over an inter-broker link. It is clear to those versed in the art that the within-broker communications between objects may use cheaper communications means, such as parameter passing between objects, whereas inter-broker communications requires generating physical messages or packets that will cross the link. In a preferred embodiment, the protocols of all view objects and transform objects will be able to recover from lost, out-of-order, or duplicate messages, and, therefore, will work correctly regardless of which paths between objects cross broker boundaries and which do not.

In order to support stateful subscriptions, a history of states is stored in a data storage device. For example, messages from the "matches" published stream 712 are stored in storage 782, messages from the "buys" published stream 722 are stored in storage 784, and messages from the "sells" published stream 734 are stored in storage 786. Storage 782, 784, 786 may be a portion of system memory or may be a persistent storage, such as a hard drive, or a combination thereof. Messages may be stored as records in a table, spreadsheet, or database, for example. While the example shown in FIG. 7 stores published messages in storage, other changes to derived views may also be stored in history storage. For example, changes to views 742, 744 may be stored in history storage for use by transform 746.

To compute and deliver message sequences to subscribers efficiently, the transforms involved in the computation must be placed on the nodes of the broker network intelligently in order to maximize some measure of performance. In accordance with a preferred embodiment of the present invention, the placement of transforms is performed continuously in response to system state changes, resource availability, and client demands. The system monitors itself using a set of agents that submit performance feedback information to the performance optimization service that uses the data to issue new transform deployment instructions to the broker network. Regardless of the placement algorithm, such a closed-loop system may sometimes decide to move some transforms from resource to resource to improve performance.

Designs with various types of dynamic process migration and task assignment for mainframe, distributed, and parallel systems are known in the art. These designs often deal with tasks that exchange data rarely, such as at an end of a computational block. In a stream-processing system the tasks performing the transforms exchange data very often. A transform object continuously receives message sequence data from its parent transform objects and sends the derived data to its children. If a transform needs to be redeployed to another network node, it should be done in a way that causes minimal disruption to the subscriptions that use it. The problem of redeploying a transform at runtime is analogous to changing a segment of a water pipe without interrupting the water flow and spilling as little water as possible.

Figure 8:
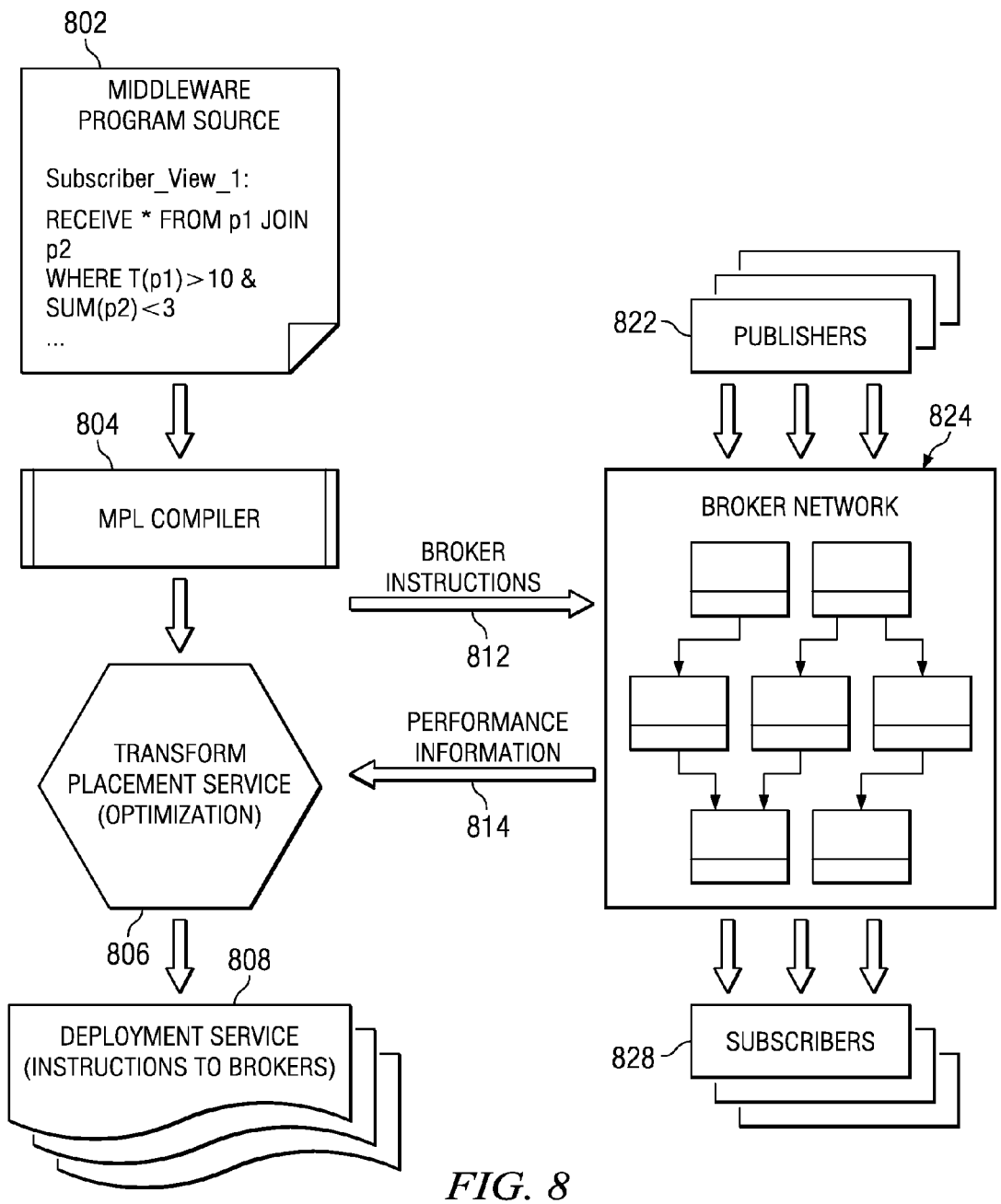
FIG. 8 depicts a process for deploying transform objects and view objects when a dataflow specification is a declarative specification in accordance with a preferred embodiment of the present invention.

FIG. 8 depicts a process for deploying transform objects and view objects when a dataflow specification is a declarative specification in accordance with a preferred embodiment of the present invention. A declarative specification is a program, such as middleware program source 802. Program source 802 may be written in a language similar to the SQL syntax, for example. Program source 802 may be compiled using compiler 804 into a dataflow hypergraph. Compiler 804 includes particular algorithms for compiling relational algebraic operators into tailored object code that implements transform objects specialized to incrementally evaluate operators, such as join, select, aggregate, etc., for relations of known data types and key signatures. The object code may be, for example, Java™ programming language code. Compiler 804 represents values of derived states as monotonic knowledge. A monotonic state can change value only in one direction. Even state values that oscillate back and forth are represented as the difference between two monotonically increasing values. Hence, the system can always detect which of two values of a single data field is older. As another example, the system distinguishes internally between a "missing value," which is missing because its value is not yet known, and one that is missing because it is known to be absent. As yet another example, the system distinguishes between a field having a value that is currently ten, but which may get larger later, from a field whose value is currently ten, but is final and will never change.

Compiler 804 generates an object for each relation and an object for each transform. Each algebraic operation with n operands is associated with one transform object with n input interfaces and one relation object with an output interface. The compiler may then generates a script that is executed at deployment time to instantiate all transform and relation objects, connecting an instance of the output interface from each relation to an instance of the input to each transform that uses the relation as an input. Base relations are fed from an "input transform" object, which delivers published messages to the relation. The objects form the knowledge flow graph, or hypergraph described earlier. Each transform in the hypergraph, such as join, project, group-by, select, etc., is associated with a template used by the compiler to produce an incremental transform. As discussed above, a transform has one or more relations feeding inputs to it and a single relation receiving its output. The incremental transform is an object that, given a message indicating that one component of its input has changed, computes the appropriate changes to its output and invokes a method in the output relation indicating what has changed.

The hypergraph may be specified explicitly or, alternatively, the hypergraph may be optimized using transform placement service 806 and deployed using deployment service 808. The hypergraph is optimized and deployed to broker network 824 by passing broker instructions 812 to broker network 824 and receiving performance information 814 from broker network 824. An optimization step consolidates multiple subscriptions to exploit common computations and performs other simplifications to reduce the total computational load on the system. A placement step allocates the transform objects of the knowledge flow graph to particular brokers for the purpose of load balancing, reduction of bandwidth, increasing update throughput and overall reduction of delays between publishers and subscribers.

Broker network 824 receives the knowledge flow graph at deployment time. At execution time, publishers 822 publish message streams to broker network 824. The brokers receive events and propagate messages representing view changes towards the subscribers. Subscribers 828 may then receive messages from subscriber views in broker network 824.

Figure 9:
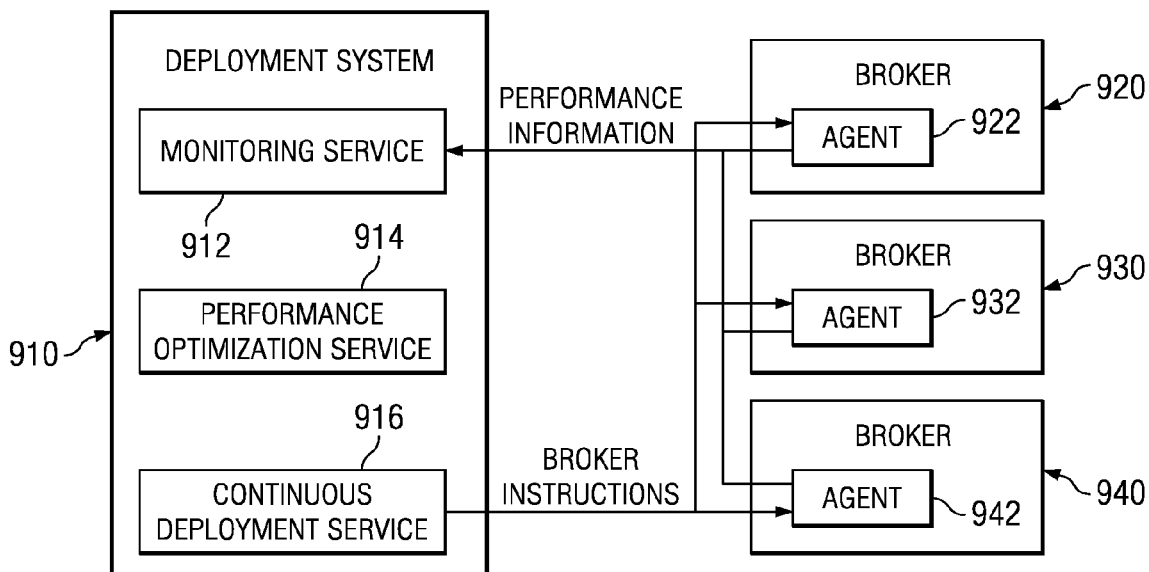
FIG. 9 illustrates a redeployment mechanism in a distributed messaging system in accordance with a preferred embodiment of the present invention.

FIG. 9 illustrates a redeployment mechanism in a distributed messaging system in accordance with a preferred embodiment of the present invention. The continuous feedback-controlled deployment system of the present invention includes deployment system 910 that has three components. Monitoring services component 912 detects the possible need to reconfigure. Performance optimization services component 914 computes a new assignment of transforms. Continuous deployment services component 916 implements a redeployment protocol that installs the changes to transform placement while the existing publish-subscribe system continues to operate.

An efficient stream transform redeployment algorithm addresses the problem of disruption that happens when a transform needs to be moved from one hosting resource to another. Since transforms continuously exchange message sequence data, there is a high probability of having messages in the transform-to-transform links during the time of the move. Furthermore, new messages are likely to appear at the moving transform inputs. If the transform is absent, the effects of these messages would not reach the subscribers and cause information gaps and delays.

The continuous transform redeployment service of the present invention limits the disruption in the message sequences as perceived by its subscribers while one or more of the subscription transforms are being redeployed. The redeployment algorithm does this by ensuring that each message sequence continues to reach its subscribers without interruption. The redeployment system may temporarily deal with message sequences through redundant paths during periods of switchover.

The continuous deployment service of the present invention in the computing middleware works in two phases. The first phase is initial deployment of the service itself. The second phase is transform deployment instructed by performance optimization service 916. In the first phase, a program (agent) is installed on each computer (broker) that needs to participate in the computing middleware. In the example depicted in FIG. 9, agent 922 is installed on broker 920, agent 932 is installed on broker 930, and agent 942 is installed on broker 940.

Each agent turns the computer into a network broker and has several capabilities: a) the capability to start/stop a particular transform in the broker program; b) the capability to receive a transform assignment from continuous deployment service 916; c) the capability to copy a transform state to an agent on another machine; d) the capability to receive/send instructions to establish/break connections between its broker program and other broker programs; e) the capability to monitor the broker program and machine performance and send the statistics to monitoring service 912; f) the capability to register its network broker as a resource with deployment system 910 so that the broker can be used for computation and message routing; g) the capability to perform diagnostics of the network broker it manages to ensure that the broker works properly; and, h) the capability to request a diagnostic report from another agent about its broker.

Each agent enters the second phase of the continuous deployment service as soon as its registration with deployment system 910 is complete. In this phase, the agent is always ready to execute the steps of the efficient stream transform redeployment algorithm discussed above, when instructed by continuous deployment service 916. The efficient stream transform redeployment algorithm is as follows:

Assuming task T needs to be moved from network broker A to network broker B,
 1. Instantiate a copy of T on system B;
 2. Duplicate all inputs into A to additionally go to B;
 3. Copy T's state from A to B;
 4. Duplicate all outputs from A to also go from B to the same children;
 5. Terminate T on A when B passes self-diagnostics and works properly.

To perform task 1 of the algorithm, the agent associated with network broker B receives the program for transform T either from its local storage or from deployment system 910 or a delegate thereof. The agent then instructs the broker to load the program and prepare to execute the transform.

To perform task 2 of the algorithm, the agent associated with network broker A sends instructions to the agent associated with network broker B about the connections network broker B would need to establish as inputs. Once the instructions are received by the agent associated with broker B, the agent instructs the broker to initialize the connections and ensure that the messages start flowing into B using these connections.

To perform task 3 of the algorithm, the agent associated with network broker A sends the copy of the state of transform T to the agent associated with network broker B. This state is a tuple that contains all of the information necessary for T to continue being evaluated properly at broker B as if it were at broker A, as well as the sequence marker indicating which last message in the sequence was processed to compute this state. The latter is necessary in order for the broker B to know what messages it can use to compute a next correct version of the state. To complete the task the agent associated with broker B loads the received state of T into the broker and ensures that T functions correctly with new state.

To perform task 4 of the algorithm, the agent associated with network broker A sends instructions to the agent associated with network broker B about the connections network broker B would need to establish as outputs. Once the instructions are received by the agent associated with broker B, the agent instructs the broker to initialize the connections and ensure that the messages start flowing out of B using these connections.

To perform task 5 of the algorithm, the agent associated with network broker A requests a diagnostic report from the agent associated with broker B. Once the agent associated with broker A receives a satisfactory diagnostic report, the agent associated with network broker A stops the transform T in its broker program.

Figure 10:
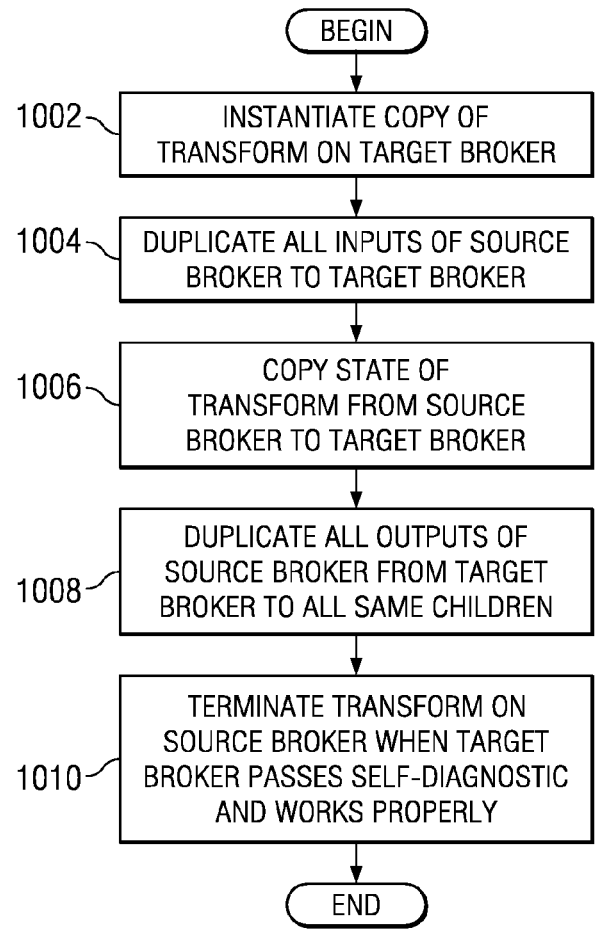
FIG. 10 is a flowchart illustrating the operation of a moving a message transform from a source broker to a target broker in a distributed messaging system in accordance with a preferred embodiment of the present invention.

FIG. 10 is a flowchart illustrating the operation of a moving a message transform from a source broker to a target broker in a distributed messaging system in accordance with a preferred embodiment of the present invention. The process begins and instantiates a copy of the transform on the target broker (block 1002). Then, the process duplicates all of the inputs of the source broker to the target broker (block 1004). The process then copies the state of the transform from the source broker to the target broker (block 1006). Next, the process duplicates all of the outputs of the source broker from the target broker to the same children (block 1008). The process terminates the transform on the source broker when the target broker passes a self-diagnostic and works properly (block 1010). Thereafter, the process ends.

The stateful publish-subscribe system of the present invention is able to be deployed on a wide-area, distributed overlay network of broker machines, communicating by message passing, and being subjected to the possibility of duplicate and out-of-order messages between links. The distributed messaging system of the present invention allows subscriptions expressed as relational algebraic expressions on published message histories. Relational algebra may include, in particular, operators such as select, project, join, extend, group-by, sum, count, and average, for example. The relational algebraic expressions may be mapped to form various query languages, such as SQL and XQUERY. Furthermore, the messaging system of the present invention may allow service specifications that are deterministic and "eventually consistent," meaning that multiple identical subscriptions eventually receive the same result, but weaker, and hence cheaper to implement, than fully consistent database systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method for moving a message transform from a source broker to a target broker in a distributed messaging system, wherein the distributed messaging system includes a network of broker machines, wherein a plurality of message transforms are deployed in the network of broker machines, and wherein the plurality of message transforms take as input one or more sequences of messages and produce as output one or more sequences of messages, the method comprising:
    starting on the target broker a copy of a given message transform from the source broker;
    duplicating all inputs into the given message transform on the source broker to additionally go to the copy of the given message transform on the target broker; and
    duplicating all outputs of the given message transform on the source broker to also go from the copy of the given message transform on the target broker to appropriate children nodes within the distributed messaging system.

2. The method of claim 1, further comprising:
    copying a state of the given message transform from the source broker to the copy of the given message transform on the target broker.

3. The method of claim 1, further comprising:
    terminating the given message transform on the source broker.

4. The method of claim 3, wherein terminating the given transform on the source broker is performed responsive to the copy of the given message transform passing a self-diagnostic.

5. The method of claim 1, further comprising:
    receiving a plurality of input messages associated with input streams;
    applying the copy of the given transform at the target broker to the plurality of input messages to form an output message, wherein the output message depends on at least two input messages from the plurality of input messages; and
    delivering the output message in an output stream.

6. A method for continuous deployment of message transforms in a distributed messaging system, wherein the distributed messaging system includes a network of broker machines, the method comprising:
    deploying a plurality of message transforms in the network of broker machines, wherein the plurality of message transforms take as input one or more sequences of messages and produce as output one or more sequences of messages;
    receiving performance information from the network of broker machines; and
    redeploying at least a subset of the plurality of message transforms in the network of broker machines based on the performance information, wherein redeploying at least the subset of the plurality of message transforms includes moving a given message transform from a source broker to a target broker in the distributed messaging system.

7. The method of claim 6, wherein redeploying at least the subset of the plurality of message transforms includes sending one or more broker instructions to at least one broker machine in the network of broker machines.

8. The method of claim 6, wherein moving the given message transform includes:
    starting on the target broker a copy of the given message transform from the source broker;
    duplicating all inputs into the given message transform on the source broker to additionally go to the copy of the given message transform on the target broker; and
    duplicating all outputs of the given message transform on the source broker to also go from the copy of the given message transform on the target broker to appropriate children nodes within the distributed messaging system.

9. An apparatus for implementing a stateful subscription service in a distributed messaging system, the apparatus comprising:
    an overlay network including a plurality of broker machines;
    a plurality of publishing clients that publish messages to published message streams;
    a performance optimization service that determines an assignment of message transforms to broker machines in the overlay network; and
    a continuous deployment service that deploys the assignment of message transforms to the plurality of broker machines, wherein the continuous deployment service redeploys at least a subset of the message transforms by moving a given message transform from a source broker to a target broker in the distributed messaging system.

10. The apparatus of claim 9, further comprising:
a plurality of execution engines running on the plurality of broker machines, wherein each execution engine within the plurality of execution engine receives input messages, processes the input messages using the transform objects, and routes output messages toward subscribers.

11. The apparatus of claim 10, wherein at least one message transform in the assignment of message transforms has at least one message delivered to its output stream that depends on more than one input message from an input stream of the message transform.

12. An apparatus for moving a message transform from a source broker to a target broker in a distributed messaging system, wherein the distributed messaging system includes a network of broker machines, wherein a plurality of message transforms are deployed in the network of broker machines, and wherein the plurality of message transforms take as input one or more sequences of messages and produce as output one or more sequences of messages, the apparatus comprising:
a bus;
a communications unit connected to the bus;
a memory connected to the bus, wherein the memory includes a set of computer usable program code; and
a processor unit connected to the bus, wherein the processor unit executes the set of computer usable program code to:
start on the target broker a copy of a given message transform from the source broker;
duplicate all inputs into the given message transform on the source broker to additionally go to the copy of the given message transform on the target broker; and
duplicate all outputs of the given message transform on the source broker to also go from the copy of the given message transform on the target broker to appropriate children nodes within the distributed messaging system.

13. The apparatus of claim 12, wherein the processor unit further executes the set of computer usable program code to:
copy a state of the given message transform from the source broker to the copy of the given message transform on the target broker.

14. The apparatus of claim 12, wherein the processor unit further executes the set of computer usable program code to:
terminate the given message transform on the source broker.

15. The apparatus of claim 14, wherein the processor unit further executes the set of computer usable program code to terminate the given transform responsive to the copy of the given message transform passing a self-diagnostic.

16. The apparatus of claim 12, wherein the processor unit further executes the set of computer usable program code to:
receive a plurality of input messages associated with input streams;
apply the copy of the given transform at the target broker to the plurality of input messages to form an output message, wherein the output message depends on at least two input messages from the plurality of input messages; and
deliver the output message in an output stream.

17. An apparatus for continuous deployment of message transforms in a distributed messaging system, wherein the distributed messaging system includes a network of broker machines, the apparatus comprising:
a bus;
a communications unit connected to the bus;
a memory connected to the bus, wherein the memory includes a set of computer usable program code; and
a processor unit connected to the bus, wherein the processor unit executes the set of computer usable program code to:
deploy a plurality of message transforms in the network of broker machines, wherein the plurality of message transforms take as input one or more sequences of messages and produce as output one or more sequences of messages;
receive performance information from the network of broker machines; and
redeploy at least a subset of the plurality of message transforms in the network of broker machines based on the performance information, wherein redeploying at least the subset of the plurality of message transforms includes moving a given message transform from a source broker to a target broker in the distributed messaging system.

18. The apparatus of claim 17, wherein redeploying at least the subset of the plurality of message transforms includes sending one or more broker instructions to at least one broker machine in the network of broker machines.

19. The apparatus of claim 17, wherein moving the given message transform includes:
starting on the target broker a copy of the given message transform from the source broker;
duplicating all inputs into the given message transform on the source broker to additionally go to the copy of the given message transform on the target broker; and
duplicating all outputs of the given message transform on the source broker to also go from the copy of the given message transform on the target broker to appropriate children nodes within the distributed messaging system.

20. A computer program product, in a computer readable storage device, for moving a message transform from a source broker to a target broker in a distributed messaging system, wherein the distributed messaging system includes a network of broker machines, wherein a plurality of message transforms are deployed in the network of broker machines, and wherein the plurality of message transforms take as input one or more sequences of messages and produce as output one or more sequences of messages, the computer program product comprising:
instructions for starting on the target broker a copy of a given message transform from the source broker;
instructions for duplicating all inputs into the given message transform on the source broker to additionally go to the copy of the given message transform on the target broker; and
instructions for duplicating all outputs of the given message transform on the source broker to also go from the copy of the given message transform on the target broker to appropriate children nodes within the distributed messaging system.

21. A computer program product, in a computer readable storage device, for continuous deployment of message transforms in a distributed messaging system, wherein the distributed messaging system includes a network of broker machines, the computer program product comprising:
instructions for deploying a plurality of message transforms in the network of broker machines, wherein the plurality of message transforms take as input one or more sequences of messages and produce as output one or more sequences of messages;
instructions for receiving performance information from the network of broker machines; and instructions for redeploying at least a subset of the plurality of message transforms in the network of broker machines based on the performance information.

22. A method for continuous deployment of message transforms in a distributed messaging system, wherein the distributed messaging system includes a network of broker machines, the method comprising:
- copying a message transform from a source broker to a target broker, the target and source broker being included in the network of broker machines;
- duplicating input connections of the source broker on the target broker, the duplicating comprising:
  - replicating the input connections of the source broker onto the target broker;
  - initializing the replicated input connections to receive messages also destined for the source broker;
- copying a state of the message transform on the source broker to the target broker, the state comprising all information required to evaluate the message transform on the target broker as if the message transform resided on the source broker, the copying comprising:
  - loading the state of the message transform and an associated sequence marker onto the target broker, the sequence marker indicating messages to be used in computing a next correct version of the message transform on the target broker; and
- duplicating output connections of the source broker onto the target broker, the duplicating comprising:
  - connecting an output of the target broker to an output child of the source broker;
  - initializing the target broker to route messages output from the target broker to the output child of the source broker;
  - performing a self-diagnostic that checks an operation of the target broker to generate a diagnostic report; and
  - responsive to the diagnostic report indicating a proper operation of the target broker, terminating the message transform of the source broker.

* * * * *